3,036,552
BULK MILK TANK SYSTEM AND
CONTROL THEREFOR
Lloyd P. Duncan and Leon L. Duncan, Washington, Mo.,
assignors to Zero Manufacturing Company, Washington, Mo., a corporation of Missouri
Filed Sept. 16, 1960, Ser. No. 56,373
8 Claims. (Cl. 119—14.18)

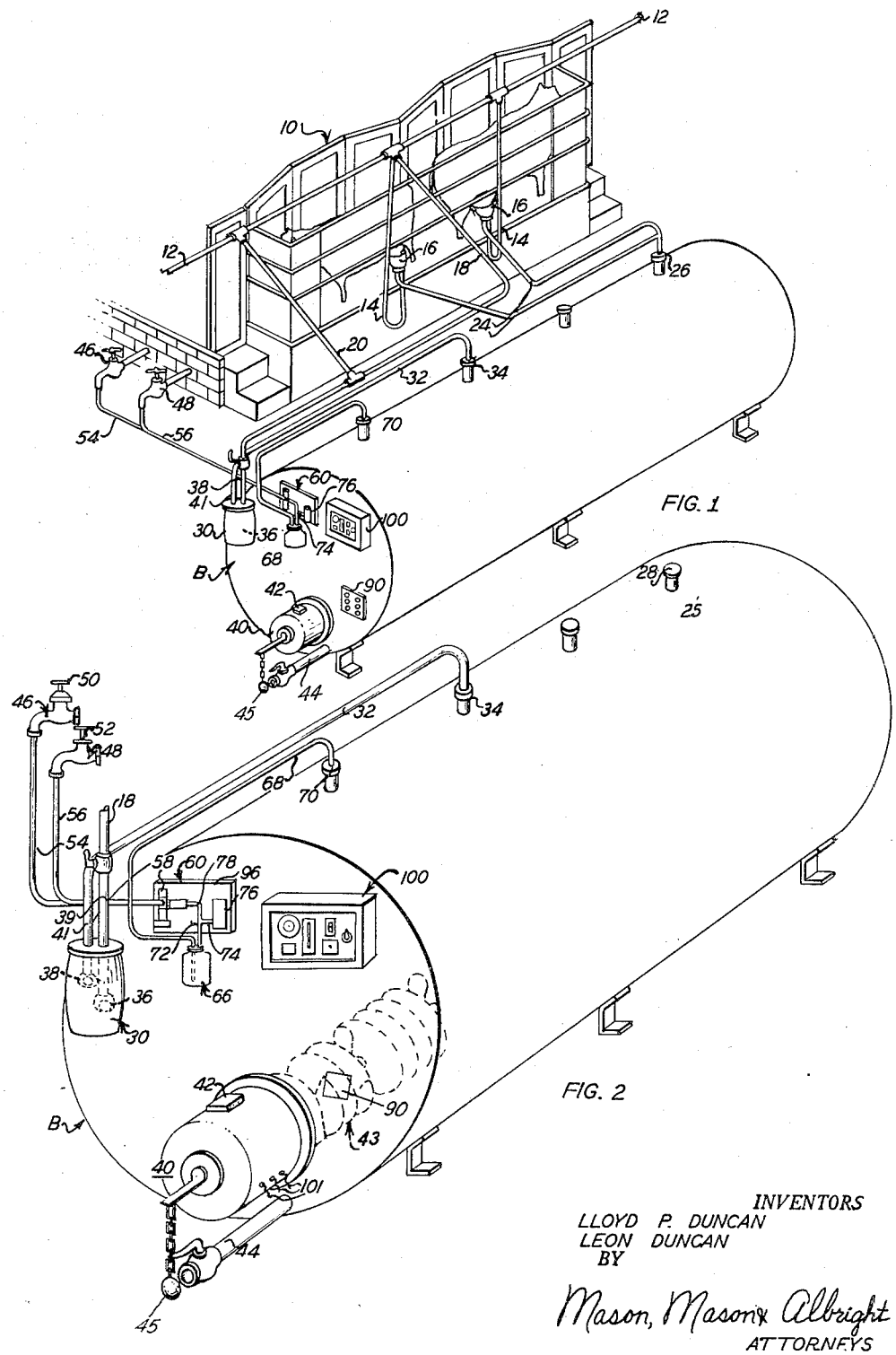

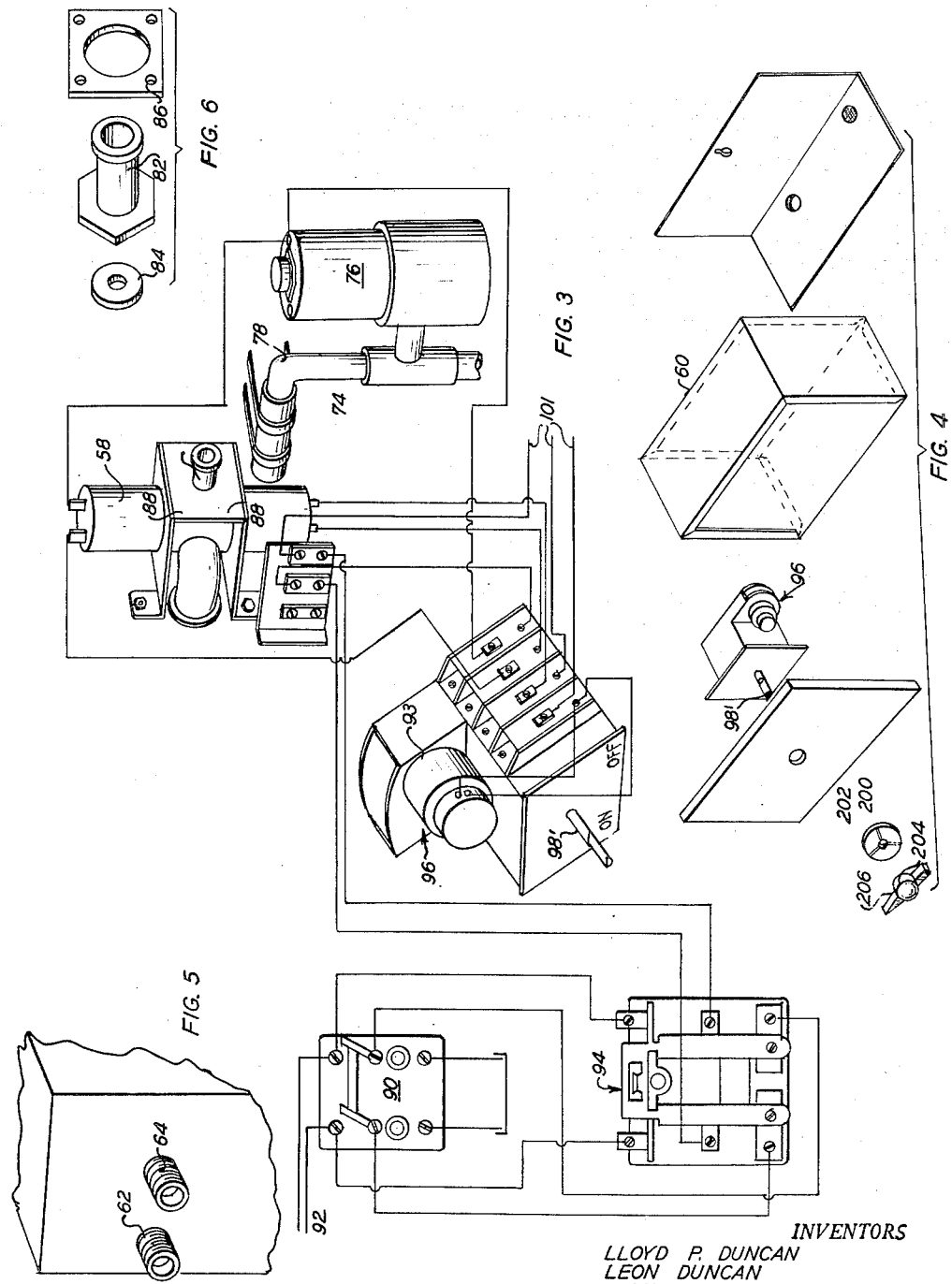

This invention relates to a bulk milk tank and means for controlling the cooling and butterfat mixing of the milk therein, and means for high speed washing, rinsing and sanitizing of the tank interior.

An object of the invention, therefore, is to provide automatic means for cooling the milk within the tank, including the agitation of the milk, the later instant butterfat mixing, following by high speed washing, rinsing and sanitizing by automatic means.

Another object is to provide by means of a single control, a control for all operations having to do with the cleansing and purifying of the interior surfaces of the tank.

Another object is the provision of combined vacuum control and pressure control means for forcing into the tank the several solutions for spray cleaning, rinsing, sanitizing and automatically draining fluids used in the treament of the tank interior.

A further object relates to the use of an automatic means for accomplishing the above objects consisting of mechanism mounted on the outside of the bulk milk tank.

Other objects will appear hereinafter throughout the specification.

In the drawings:

FIGURE 1 is a perspective view of a portion of the milking parlor with pipe connections to the bulk milk tank;

FIGURE 2 is a perspective view showing one end of the tank equipped with the automatic washing, rinsing and sanitizing apparatus;

FIGURE 3 is an exploded view of the automatic mechanism and the circuit connected thereto;

FIGURE 4 is an exploded view of the automatic washer control box;

FIGURE 5 is a perspective view showing the couplings for connecting the hot and cold water hoses to the milking chamber; and FIGURE 6 is an exploded perspective view of certain parts of the flow washer mechanism.

Referring to FIGURE 1 of the drawings, the letter A indicates a milking parlor and B shows a bulk milk tank located in said milking parlor.

The milking parlor has a stall construction 10 for a plurality of animals such as cows, two being illustrated. Extending longitudinally of the milking parlor is a vacuum line 12, said line having branch lines 14 leading to the sets of teat cups 16.

There has been illustrated a pair of additional branch lines 18 and 20 leading from the main line 12 directly to the moisture trap 30. This is accomplished by leading one or both lines 24 to the milk nipple 26, shown in FIGURE 1. When the cleansing operation is performed, which includes spray cleaning, rinsing and sanitizing, by means of treated water within the tank B, it is contemplated that lines 24 be disconnected from the nipple 26 and a rubber or other type plug 28 is used to close this opening.

Referring now to FIGURES 1 and 2, the main vacuum line 12 is provided with one or more branch lines 18 and 20 which are connected to the moisture trap 30, shown in FIGURE 2. It will be noted that there is a secondary branch line 32 leading away from the moisture trap and connecting this trap to the vacuum nipple 34 leading into the tank B. The ends of the lines 18 and 32 which extend into the moisture trap 30 are provided (FIGURE 2) with a safety overflow ball valve 36 and a ball check valve 38, respectively, for closing the ends of the pipes 39 and 41 respectively.

The fluids in tank B whether they are milk or cleansing solutions are agitated by means of a direct current motor 40 having an adjustable rheostat 42 thereon. The motor drives the agitator 43. The motor and agitator and the means for mounting the same are preferably the same as those illustrated in our co-pending application Serial No. 56,372, filed concurrently herewith, and these parts, together with the drain valve construction 44 which is the same as that illustrated in our co-pending application, hence will not be illustrated in detail.

Numerals 46 and 48 are hot and cold water spigots, respectively, and each of these is provided with the usual hand-operated valves 50 and 52, respectively. The hose connections 54 and 56 which are connected to the spigots are attached at their opposite ends to the mixing valve 58 which is located in the automatic washer box 60. These connections are indicated in FIGURE 5 by reference numerals 62 and 64.

Referring again to FIGURES 1 and 2, it will be noted that the end of the tank also mounts a detergent dump 66 having a conduit 68 connected to the wash water nipple 70 that is located on top of the tank B and which communicates with the interior of the tank.

Referring now to FIGURES 2 and 3, it will be noted that the pipe 72, whose lower end connects to the detergent pump, is provided with two branches, one of which as indicated by numeral 74 leads to the vacuum release solenoid 76, and the other branch 78 leads to the mixing valve 58. The branch 78 is provided with a rubber section or sleeve 80 (FIGURE 3) which is adapted to be sleeved over the nipple 82. Located between this nipple and sleeve 80 is a rubber flow washer 84. These parts are held in position on the control box by a plate 86 which may be of square configuration and which mounts the mixing valve 58 by means of the screws 88.

In FIGURE 3 will be found an electrical diagram showing the circuit connections to several of the parts including the electrical timer, the manually operated switch, the relay, and the vacuum release solenoid.

The switch is shown by reference numeral 90, said switch being connected to a source of electrical potential not shown which is connected to leads 92. Also connected to the switch is the relay indicated generally by the numeral 94. This relay is connected to the electrical timer 96 whose switch 98' serves as an off and on switch. When the switch is pushed inwardly, the current to the timer is off; when it is pulled outwardly the current is on, whereby to drive the electrical timer motor 93. It will be further noted that the electrical timer is connected to the vacuum release solenoid valve 76 and to the mixing valve 58. The control panel 100 houses the switch mechanism and the relay as shown in FIGURE 2.

It will be noted that the timer (FIGURE 3) is provided also with leads 101 which connect to the variable speed motor 40 that drives agitator 43. Preferably this motor is a direct current motor so that a very low speed may be used for moving the milk in heat exchange contact with the inner chilled wall of the tank during the time the tank is being filled or partially filled with milk, and during storage of the milk.

It will be understood that the tank B, depending upon its size, may be in accordance with FIGURES 2 or 3 of our co-pending application referred to above, i.e. when a small tank is being used a vacuum lead will be provided, and when a larger tank is used the lead will be dispensed with, but in either event the tank comprises a pair of spaced walls with insulation between the walls and cooling means such as a coil as described and shown in our co-pending application which usually comprise a serpentine coil welded to the lower outside portions of the inner casing, corresponding to casing 36 of FIGURE 2 or 36' of FIGURE 4 of the said co-pending application.

When it is desired to mix the butterfat, the motor is run at an intermediate speed, as, for example, up to 90 r.p.m. After the milk is drained and the washing solution has been introduced into the tank, the speed is increased up to 800 r.p.m. or higher.

*Operation*

Assuming that the tank has been filled with milk one or more times, during each of these operations the milk is first subjected to the very slow rotation of the agitator as driven by the motor 40, following by increasing the r.p.m. of the motor and the agitator driven thereby up to about 90 r.p.m. for mixing the butterfat. The milk is then drained followed by another filling of the milk tank, the milk being again initially gently moved for maximum cooling effect, then stirred at a higher speed or mix the butterfat up to about 90 r.p.m. After several of these operations, it becomes necessary to clean the interior of the tank.

Before cleaning, the rheostat 42 is set to high, or in the neighborhood of 900 r.p.m., after which the switch 90 is closed, which starts the timer 96 causing the cleaning cycle to begin. The closing of the switch causes the vacuum to be applied to the tank by the timer and causes the drain outlet 44 to be closed by the ball valve 44. The timer next admits a mixture of hot and cold water to the tank by way of conduits 54, 56 to the mixer valve whereupon it is forced upwardly by the pressure of the water from the spigots 46 and 48 and by the partial vacuum within the tank B. At this time the switch 90 has also started the motor 40 at high speed so that the liquids after entering the tank B are forced with great velocity by the agitator driven by said motor against all of the inner parts of the inside casing of tank B.

Referring now to FIGURE 4, showing the automatic washer control box which contains switch shaft 98', the said shaft is connected to the switch for the timer including the dial 202 connected to the finger 204 having a pointer 206. The numeral 200 represents the twelve o'clock position on the dial. The switch may be in the "on" position, the "automatic" position, or the "off" position. As illustrated, when the shaft 98 is pushed in, the switch is off; when it is pulled out, the switch is on, but any other suitable switch arrangement may be used to turn the current on and off and to regulate the speed of the timer by rotating the finger 204 in either a clockwise or counterclockwise direction.

The leads 190 may be connected to a vacuum pump, not shown.

Although not specifically shown, it will be understood that a pulsator may be provided during the milking operation. Instead of a pump, the vacuum used on the tank may be relased to cause the tank to empty itself of washing liquids. The detergent may be in powder or liquid form and supplied to the tank by any suitable means together with the hot and cold water under normal pressure for washing the tank. The action of the agitator, of course, upon admission of the cleansing fluids to the tank, assists the washing operation as controlled by the automatic timer. A vacuum release drain or a gravity drain may be utilized in connection with the timing mechanism, but it will be understood that any arrangement which will supply the necessary amount of detergent and washing liquids to cleanse the tank and dispose of the washing compounds at the proper time may be used.

The above description and drawings disclose a single embodiment of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

We claim:

1. A system for milking a farm animal and for cooling and storing the milk as it comes from the animal comprising a bulk milk tank, a milking means and a milk conduit means extending therefrom to the interior of said tank, a vacuum line means for connecting the same to the interior of said tank, a combined milk stirrer and cleaning solution distributor located in said tank and an electric motor drivingly connected to said stirrer and distributor, a drain means from said tank interior, valve means for closing said drain means, a wash water means including a detergent dump, a source of hot and cold water, a mixing means for mixing hot and cold water from said source, an electrical timer, and an inlet into the interior of the tank for admitting wash water from said mixing means, and manually operated control means for the operation of said timer, means operatively connected to said electrical timer for changing the speed of the electric motor whereby to stir milk at low speed and spray clean at high speed, and for rinsing, sanitizing and automatically draining fluids from said tank all in sequence as controlled by said timer.

2. The structure of claim 1 wherein said electric motor is a direct current motor.

3. The structure of claim 1 wherein means is provided for cutting off or applying vacuum from said vacuum line to the interior of said tank, said last-named means being operable by said control means.

4. The structure of claim 2 wherein means is provided for cutting off or applying vacuum from said vacuum line to the interior of said tank, said last-named means being operable by said control means.

5. The structure of claim 3 wherein said means for cutting off or applying said vacuum to said tank includes a vacuum release solenoid.

6. The structure of claim 4 wherein said means for cutting off or applying said vacuum to said tank includes a vacuum release solenoid.

7. The structure of claim 5 wherein means is provided for operating said vacuum release means by said electrical timer.

8. The structure of claim 6 wherein means is provided for operating said vacuum release means by said electrical timer.

References Cited in the file of this patent

UNITED STATES PATENTS 2,873,723     Duncan et al.    _____ Feb. 17, 1959